United States Patent
Sato

[11] 3,833,806
[45] Sept. 3, 1974

[54] AUTOMATIC FOCUS CONTROL CIRCUIT
[75] Inventor: Takayoshi Sato, Tokyo, Japan
[73] Assignee: Fuji Photo Optical Co., Ltd., Omiya-shi, Japan
[22] Filed: Oct. 2, 1973
[21] Appl. No.: 402,763

[30] Foreign Application Priority Data
Oct. 4, 1972  Japan.............................. 47-99572

[52] U.S. Cl.................... 250/201, 95/44 R, 350/46, 352/140
[51] Int. Cl. ............................................ G03b 3/00
[58] Field of Search........... 250/201; 95/44 R, 44 C, 95/45; 350/46; 352/140; 356/122, 123, 125, 126

[56] References Cited
UNITED STATES PATENTS
3,041,459   6/1962   Greene, Jr. ......................... 250/201

Primary Examiner—James W. Lawrence
Assistant Examiner—Davis I. Willis

[57] ABSTRACT

A vibrating slit is provided in front of a photoelectric element which is positioned on a focal plane of a taking lens of a camera and receives a light image focussed thereon by the lens. The output current of the photoelectric element is differentiated through a differentiation circuit and is put into a differential amplifier at two input terminals thereof through memory circuits of different time constant connected with the two input terminals of the amplifier respectively. The output of the differential circuit is connected with an operating circuit for controlling a focussing ring and the like.

7 Claims, 5 Drawing Figures

AUTOMATIC FOCUS CONTROL CIRCUIT

BACKGROUND OF THE INVENTION

1. Field of the Invention

This invention relates to an automatic focus control circuit used for a photographic camera and the like, and more particularly to an electric circuit adapted to detect the focussing position and operate a focussing means connected with a photoelectric element provided with a vibrating slit which is laterally vibrated just in front thereof through a differentiation circuit.

2. Description of the Prior Art

It has been conventionally known in the art to automatically focus an image in a photographic camera by use of an electric circuit which detects a focussing positon employing a photoelectric element.

In one of the conventional circuits which detect the focussing position, a slit is provided in front of a photoelectric element positioned on a focal plane of a taking lens and is vibrated in a plane perpendicular to the optical path of the taking lens. The output current of the photoelectric element is differentiated to show the rate of change in intensity of light passing through the vibrating slit. This rate of change in intensity represents the contrast of the image focussed on the photoelectric element. Since the contrast of an image is lowered when the image is blurred, it is possible to know the position of focus by measuring the contrast while the focussing lens is moved slowly back and forth along the optical path of the lens. That is, the position where the rate of change in intensity of light coming through the vibrating slit is maximum is the position of focus where the image is most sharply focussed.

In a conventional method disclosed in Japanese Pat. Publication No. 37,956/1971 filed, the output current obtained from a photoconductive element is differentiated and then the maximum value of the differentiated output is detected by an electric means. In this conventional method, the electric means for detecting the maximum value of the differentiated output is very complicated, and accordingly it is practically difficult to detect the maximum value and automatically focus the image. This is mainly because the output current differentiated through a differentiation circuit has a complex alternating current wave form.

SUMMARY OF THE INVENTION

In view of the above defects in the conventional method, it is the primary object of the present invention to provide an automatic focus control circuit which effectively detects the position of focus with a simple circuit construction.

Another object of the present invention is to provide an electric circuit for detecting a focussing position in a camera which has small number of elements and accordingly can be made at a low cost.

Still another object of the present invention is to provide an electric circuit for detecting a focussing position by use of a differential amplifier which is connected with a photoelectric element through a differentiation circuit and memory circuits of different time constant.

A further object of the present invention is to provide an electric circuit for detecting a focussing position by use of a differential amplifier which is connected with a photoelectric element through a differentiation circuit and two memory circuits of the same time constant one of which is provided with a discharge circuit for shortening the memory time thereof.

Other objects and features of the present invention will be made more explicit from the following summary of the invention.

The automatic focus control circuit in accordance with this invention is connected with an operating circuit which is in turn associated with a focussing ring of a camera to control the focussing ring. The focus control circuit mainly comprises a differential amplifier which receives two input currents from a photoelectric element through a differentiation circuit. The two input currents are put into the differential amplifier through memory circuits of different time constant respectively. The memory circuit of longer time constant memorizes the maximum value of the differentiated outut current throughout the movement of the lens. The outer memory circuit of shorter time constant memorizes the maximum value of the differentiated output current throughout each cycle of vibration of the slit. The output of the differential amplifier becomes zero when the two input currents become the same in value. The position where the two input currents become the same is the position of the maximum of the output current of the differentiation circuit where the contrast of the image formed on the photoelectric element is the maximum and accordingly the image is sharply focussed. The output of the differential amplifier is connected with a focussing ring operating circuit.

Other objects, features and advantages of the present invention will be made apparent from the following detailed description of preferred embodiments thereof taken in conjunction with the accompanying drawing.

BRIEF DPSCRIPTION OF THE DRAWING

FIG. 1 is a side view showing the arrangement of a photoelectric element, a slit and a taking lens of a camera used in association with the circuit of this invention, FIG. 2 is a circuit view showing an embodiment of the focus control circuit in accordance with the present invention, FIG. 3 is a circuit view showing another embodiment of the focus control circuit in accordance with the present invention, FIG. 4 is a graphical representation of the output of the photoelectric element, and FIG. 5 is a graphical representation of the inputs put into the differential amplifier through different memory circuits.

DESCRIPTION OF THE PREFERRED EMBODIMENTS

Figure 1:
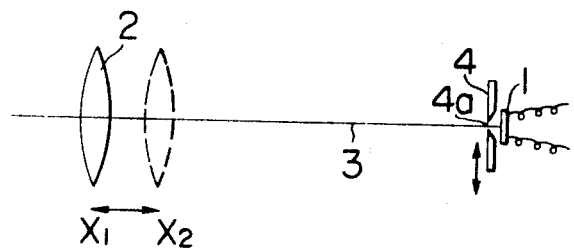

Referring first to FIG. 1, a photoelectric element 1 such as a photoconductive element of a photovoltaic element is positioned on a focal plane of a taking lens 2 of a photographic camera. The taking lens 2 is movable back and forth along the optical path 3 thereof. Just in front of the photoelectric element 1 is provided a slit plate 4 having a small optical slit 4a of a width much smaller than the width of the photoelectric element 1. The slit plate 4 is movable in the direction perpendicular to the optical path 3 and in perpendicular to the direction of the slit. The slit plate 4 is vibrated with a high frequency in the movable direction. By the vibration of the slit plate 4, the image focussed on the photoelectric element 1 is scanned and the output current of the element 1 is fluctuated.

The output current of the photoelectric element 1 is put into a differentiation circuit and differentiated thereby.

Figure 2:
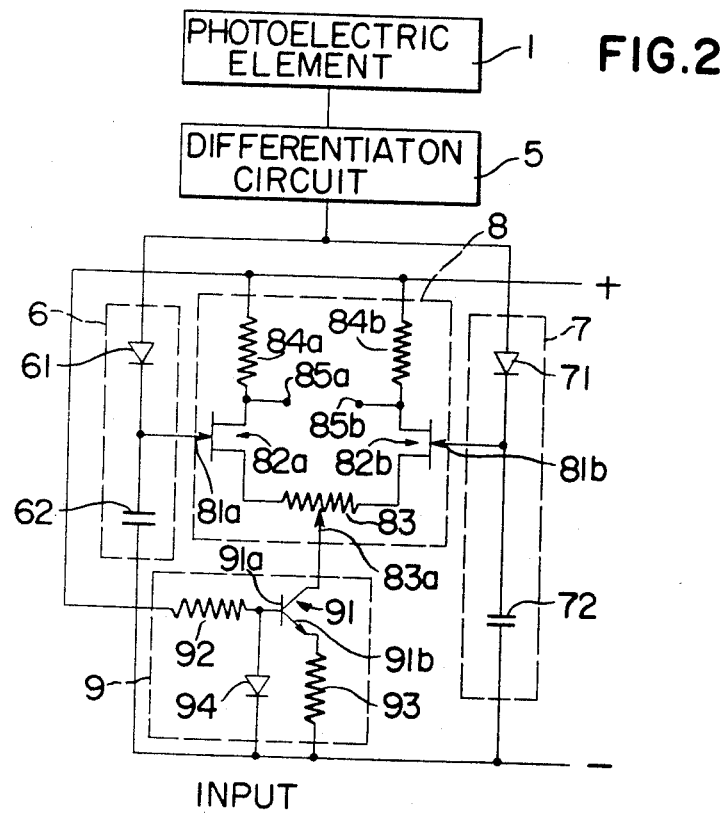

Referring to FIG. 2 showing an embodiment of the circuit in accordance with the present invention, the output from the differentiation circuit 5 is put into two memory circuits 6 and 7. One of the memory circuits 6 comprises a diode 61 and a capacitor 62 connected in series. The other memory circuit 7 comprises a diode 71 and a capacitor 72. The diodes 61 and 71 are connected with the differentiation circuit 5 and the capacitors 62 and 72 are grounded. The connecting point between the diode 61 and the capacitor 62 is connected with one of two input terminals 81a of a differential amplifier 8. The connecting point between the diode 71 and the capacitor 72 is connected with the other of the two input terminals 81b of the differential amplifier 8. The differential amplifier 8 comprises two FETs (field effect transistor) 82a and 82b connected with each other by way of a variable resistor 83, and resistors 84a and 84b connected between the FETs 82a and 82b and the power source respectively. A constant voltage circuit 9 is connected with the variable resistor 83 at the sliding contact thereof 83a. The constant voltage circuit 9 comprises a transistor 91, a resistor 92 connected between the base 91a of the transistor 91 and the power source, a resistor 93 connected between the emitter 91b of the transistor 91 and ground, and a diode 94 connected between the ground and a connecting point between said resistor 92 and the base 91a of the transistor 9.

The time constant of the memory circuit 6 is made considerably different from that of the other memory circuit 7 by so selecting the capacitance of the capacitors 62 and 72. Practically, the capacitance of the capacitor 62 is selected to be large in comparison with the capacitance of the capacitor 72. Then, the time constance of the first memory circuit 6 is made considerably larger than the time constance of the second memory circuit 7. The diodes 61 and 71 are so prepared that the inverse current flowing through the diode 61 is much smaller than the inverse current flowing through the diode 71.

Figure 4:
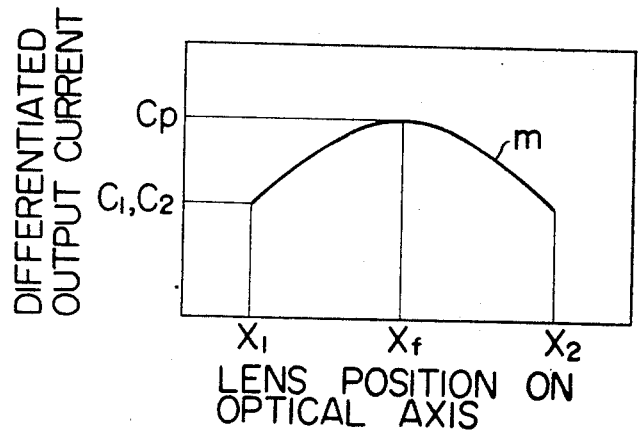

In operation, the output from the differentiation circuit 5 is put into the diodes 61 and 71 and charged in the capacitors 62 and 72. As shown in FIG. 4, the output current of the differentiation circuit 5 changes as the taking lens 2 is moved back and forth. The curve $m$ shown in FIG. 4 represents the maximum value of the differentiated output current in each cycle of vibration of the slit plate 4 which changes as the lens 2 moves back and forth. When the taking lens 2 moves from the front extreme position $x_1$ to the rear extreme position $x_2$, the curve $m$ starts from the lowest position $C_1$ and rises up to the highest position $C_p$ when the lens 2 is in the best focussing position $x_f$ and then falls down to the lowest position $C_2$.

The memory circuit 6 memorizes the highest value of the output current of the differentiation circuit 5 by charging the capacitor 62 with the voltage corresponding to the highest output current $C_p$. On the other hand, the other memory circuit 7 of shorter time constant memorizes the highest value of the output current of each of the cycles of vibration of the slit plate 4 which is the same as the curve $m$ shown in FIG. 4.

Figure 5:
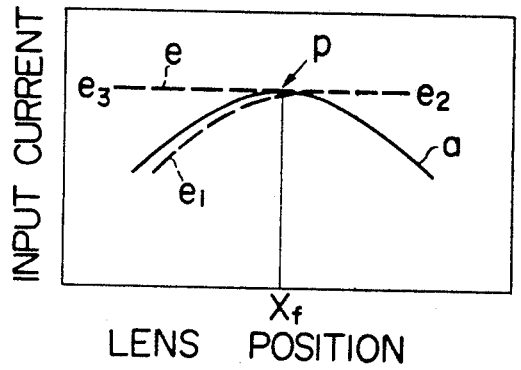

Referring to FIG. 5, the input current from the memory circuit 6 into the differential amplifier 8 when the lens 2 is moved from the position $x_1$ to $x_2$ and then back to $x_1$ is represented by the curve $e$ ($e_1$–$e_2$–$e_3$). The input current from the other memory circuit 7 into the differential amplifier 8 is represented by the curve $a$ which is the same as the curve $m$ shown in FIG. 4. Since the differential amplifier 8 generates an output corresponding to the difference between the inputs given at the two input terminals 81a and 81b, the output current obtained at the output terminals 85a and 85b becomes zero when both inputs become equal. Therefore, when the input current $a$ from the memory circuit 7 becomes equal to the input current $e$ at the position P where the taking lens 2 is in the best focussing position $x_f$, the output current from the output terminals 85a and 85b becomes zero.

Thus, it becomes possible to automatically focus an image in a photographic camera by connecting a focussing ring operating circuit including a servomotor or the like with the output terminals 85a and 85b of the differential amplifier 8.

In the above-described embodiment of the present invention shown in FIG. 2, the time constant of the memory circuit 7 is made shorter than that of the memory circuit 6 by making the capacitance of the capacitor 72 smaller than that of the capacitor 62 and making the amount of inverse current flowing through the diode 61 smaller than that flowing through the diode 71. However, it will be understood that the effective time constant of the memory circuit 7 can be made shorter than that of the memory circuit 6 by use of various electric means. One method of making the effective time constant of the memory circuit 7 shorter than that of the memory circuit 6 is shown in FIG. 3.

Figure 3:
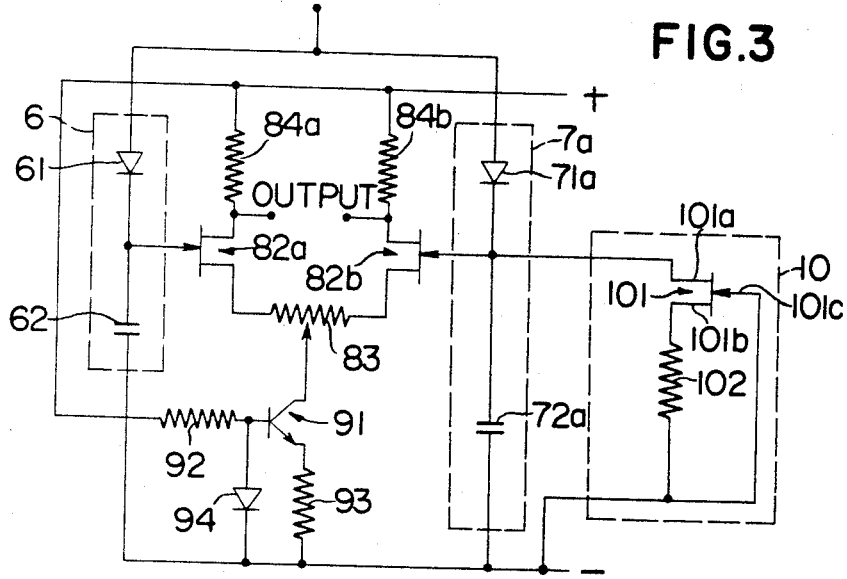

Referring to FIG. 3, all the elements which are the same as those employed in the above embodiment shown in FIG. 2 are indicated with the same reference numerals, the detailed description of which is accordingly omitted here. The diode 71a and the capacitor 72a corresponding respectively to the diode 71 and the capacitor 72 employed in the embodiment shown in FIG. 2 may be the same as the diode 61 and the capacitor 62. In order to make the effective time constant of the second memory circuit 7a shorter than that of the first memory circuit 6, with the capacitor 72a of the same capacitance as that of the capacitor 62, a discharge circuit 10 is connected across the capacitor 72a of the second memory circuit 7a. The discharge circuit 10 comprises an FET (field effect transistor) 101 and a resistor 102 connected in series with a source 101b thereof. The drain 101a of the FET is connected with a connecting point between the diode 71a and the capacitor 72a. The gate 101c of the FET 101 is grounded. In this embodimemt, when a voltage across the resistor 102 rises up to a predetermined level, an electric current flows through the FET 101 to discharge the capacitor 72a. Thus, the second memory circuit 7a repeats memorization and discharge of the maximum value of the output current from the differentiation circuit in each cycle of vibration of the slit plate 4. Then, the second memory circuit 7a together with the discharge circuit 10 operates in the same manner as that of the second memory circuit 7 employed in the embodiment shown in FIG. 2.

The focus control circuit in accordance with the present invention as described hereinabove is applicable to automatically control the focus in a photographic camera by connecting a focussing ring operating circuit including a servomotor or the like with the output of the differential amplifier employed in the circuit as described above. Further, it is also possible to indicate the focussing position of the taking lens by turning on an indicating lamp in a viewfinder of the camera by use of a signal indicating lamp connected with the output terminals of the differential amplifier by way of a switching means. Thus, it becomes possible to indicate the focussing position in the viewfinder of a camera to facilitate the manual focus control of a camera.

I claim:

1. An electric circuit for detecting a focussing position of a taking lens in a photographic camera connected by way of a differentiation circuit with a photoelectric element on which an image is focussed through the taking lens, said photoelectric element being provided with a laterally vibrating slit in front thereof to give a fluctuating output current, said circuit, comprising:

a first memory circuit connected with said differentiation circuit having a time constant which is long enough to memorize the highest value of the output of the differentiation circuit throughout the movement of the taking lens, a second memory circuit connected with said differentiation circuit having a time constant which is short enough only to memorize the highest value of the output of the differentiation circuit in each cycle of vibration of said slit, and a differential amplifier connected at input terminals thereof with said first and second memory circuits to receive inputs from the memory circuits and give an output corresponding to the difference between the level of the inputs, whereby an output signal indicating the focussing position of the taking lens in obtained at the output terminals of the differential amplifier.

2. An electric circuit for detecting a focussing position of a taking lens in a photographic camera as defined in claim 1 wherein each of said first and second memory circuits comprises a diode and a capacitor connected in series, and with the capacitance of the capacitor of the second memory circuit much smaller than that of the capacitor of the first memory circuit.

3. An electric circuit for detecting a focussing position of a taking lens in a photographic camera as defined in claim 1 wherein each of the first and second memory circuits comprises a diode and a capacitor connected in series, the property of the diodes and the capacitors is the same, and a discharge circuit is connected with the second memory circuit to shorten the effective time constant of the second memory circuit.

4. An electric circuit as defined in claim 3 wherein said discharge circuit comprises a field effect transistor and a resistor connected in series with the source of the transistor, the drain of the field effect transistor is connected with a connecting point between the diode and the capacitor of the second memory circuit, and the resistor and the gate of the transistor are grounded.

5. An electric circuit as defined in claim 1 further comprising means for operating a focus control means which is connected with the differential amplifier and controls the focus control means in accordance with the output signal given by the differential amplifier.

6. An electric circuit as defined in claim 1 further comprising means for focussing position indicating means connected with the differential amplifier and indicates the focussing position when the output of the differential amplifier becomes zero.

7. An electric circuit as defined in claim 5 wherein an indication lamp is connected with the differential amplifier by way of a switching means which is actuated to energize the indication lamp when the output of the amplifier becomes zero.

* * * * *